United States Patent
Xi et al.

(10) Patent No.: US 10,864,583 B2
(45) Date of Patent: Dec. 15, 2020

(54) RESET MECHANISM

(71) Applicant: Shenzhen Xhorse Electronics Co., Ltd, Shenzhen (CN)

(72) Inventors: Yongfeng Xi, Shenzhen (CN); Shiting Han, Shenzhen (CN); Yijie Hao, Weifang (CN); Yuan He, Shenzhen (CN); Guozhong Cao, Shenzhen (CN); Chenglong Li, Shenzhen (CN); Junfeng Chen, Yuzhou (CN)

(73) Assignee: SHENZHEN XHORSE ELECTRONICS CO., LTD, Shenzhen (CN)

( * ) Notice: Subject to any disclaimer, the term of this patent is extended or adjusted under 35 U.S.C. 154(b) by 0 days.

(21) Appl. No.: 15/860,658

(22) Filed: Jan. 3, 2018

(65) Prior Publication Data
US 2019/0015907 A1 Jan. 17, 2019

(30) Foreign Application Priority Data
Jul. 11, 2017 (CN) .......................... 2017 1 0561881

(51) Int. Cl.
*B23C 3/35* (2006.01)
*B23P 15/00* (2006.01)

(52) U.S. Cl.
CPC .............. *B23C 3/35* (2013.01); *B23P 15/005* (2013.01); *B23C 2235/21* (2013.01); *Y10T 409/300952* (2015.01)

(58) Field of Classification Search
CPC . B23C 3/35; B23C 3/355; Y10T 409/300952; Y10T 409/301008; Y10T 409/301064
USPC ............................................... 409/81, 82, 83
See application file for complete search history.

(56) References Cited

U.S. PATENT DOCUMENTS

| | | | | |
|---|---|---|---|---|
| 1,752,668 A | * | 4/1930 | Johnson | ..................... B23C 3/35 409/81 |
| 1,775,921 A | * | 9/1930 | Williams | ................... B23C 3/35 409/81 |
| 1,803,428 A | * | 5/1931 | Falk | ........................... B23C 3/35 409/81 |

(Continued)

FOREIGN PATENT DOCUMENTS

| | | | | |
|---|---|---|---|---|
| CA | 2956690 A1 | | 8/2017 | |
| GB | 2276106 A | * | 9/1994 | ............... B23C 3/35 |
| WO | 2012/096685 A1 | | 7/2012 | |

*Primary Examiner* — Sunil K Singh
*Assistant Examiner* — Michael Vitale
(74) *Attorney, Agent, or Firm* — Andrew Malarz, Esq.

(57) ABSTRACT

The invention relates to a reset mechanism of the key duplication device which comprises a reset apparatus, a spindle and a body, wherein the spindle is inserted into the body and is rotatably connected to the body. Between workspace and a loading area, the body is repeatedly moveable along the spindle. The reset mechanism comprises an elastic member connected with the body. Elastic forces of the elastic member always act on the body and move the body toward the workspace. After the body is rotated to the loading area against the elastic forces of the elastic member, when a withdrawal force exceeds the elastic forces, the body automatically returns to the workspace under the influence of the elastic forces. The fewer and easier operating steps the more efficient work of the reset mechanism is, and the mechanism more conforms to the ergonomics design.

6 Claims, 7 Drawing Sheets

(56) References Cited

U.S. PATENT DOCUMENTS

| | | | | |
|---|---|---|---|---|
| 1,811,922 A | * | 6/1931 | Falk | B23C 3/35 409/81 |
| 1,978,009 A | * | 10/1934 | Caron | B23C 3/35 409/82 |
| 3,138,999 A | * | 6/1964 | Haggstrom | B23C 3/35 409/83 |
| 2013/0029485 A1 | | 11/2013 | Bass | |
| 2016/0375504 A1 | | 12/2016 | Mutch | |

\* cited by examiner

RESET MECHANISM

BACKGROUND OF THE INVENTION

Field of the Invention

The present invention relates to a technical field of the reset mechanism of a key duplication device.

Description of Related Art

With development of automation technology, goods or other products have to be secured and moved to the specified work or non-work station during processing or manufacturing. Afterwards, the goods or other products, return to the original position as required, and this process is called restoration or reset of the position of the goods or other products.

During a process of key duplication, a worktable of the key duplication device is loaded in one position and then moved to the designated position for processing. After completion of the key duplicating process, the worktable is removed and a new cycle of operation is started. At present time, most of worktable mechanisms for key duplication devices are required to be manually held on the worktable.

During working process, a position and an angle of the worktable are manually manipulated. During non-working phase, the worktable stops in the limited position under self weight. The manually-operated worktable is complicated, and is low in machining precision and work efficiency. In this way, errors are prone to occur and the worktable fails to meet the actual needs. In a small number of semi-automatic key duplication devices, an operation of the reset mechanism needs to be reset manually by pressing a reset button at the same time. The semi-automatic key duplication devices have disadvantages of being troublesome in operation and poor in user experience. Moreover, the semi-automatic key duplication devices do not accord with the idea of ergonomics.

From the Canadian Patent Application No. CA 2956690 A1, a key duplication machine is known having user-based functionality. The machine duplicates features of an existing key within a key blank. The machine may have an identification module configured to capture data associated with the features of the existing key, a fabrication module configured to cut the features in the key blank based on the data, a user input device, and a controller in communication with the identification module, the fabrication module, and the user input device. The controller may be configured to regulate operation of the identification module and the fabrication module, and to receive input from a user via the user input device. The controller may also be configured to selectively implement of a first mode of operation or a second mode of operation based on the input.

The U.S. Patent Publication No. US 2016375504 A1 teaches the apparatus, methods, and other embodiments associated with a key duplication machine. In one embodiment, an assembly for duplication a master key includes an optical imaging device, a logic, a clamping assembly, and a cutting member. The optical imaging device is capable of capturing an optical image of at least a portion of the master key. The logic is capable of determining a key pattern of the master key from the optical image of the master key. The clamping assembly is capable of clamping a key blank and the cutting member is capable of cutting a key pattern into the key blank.

From the U.S. Pat. No. 5,676,504 the key cutting machine is known which contains a cutter wheel, a key follower and a key positioning fixture for retaining a master key and a key blank in defined position. Longitudinal and lateral displacement elements displace the cutter wheel and the key blank relative to each other. First and second electronic position sensors generate cutter wheel longitudinal and lateral position signals which electrically define the position of the cutter wheel relative to the key blank blade. A mode control system selectively operates the key cutting machine in either an analog mode where the bit notch pattern of a master key is mechanically traced and duplicated in the key blade blank or is a digital mode in which an electronically defined bit notch pattern is electronically duplicated in the key blank blade without reference to or tracing the master key bit notch pattern.

BRIEF SUMMARY OF THE INVENTION

The present invention provides a reset mechanism which is designed to solve the complicated technical problem during operation of the key duplication device.

The reset mechanism for the key duplication device includes a reset apparatus, a spindle and a body. The spindle is inserted into the body and is rotatably connected to the body. Between a workspace and a loading area, the body is repeatedly moveable along the spindle.

The reset apparatus comprises an elastic member connected with the body. Elastic forces of the elastic member always act on the body, thereby moving the body toward the workspace. After the body is rotated to the loading area against the elastic forces of the elastic member, when a withdrawal force exceed the elastic forces, the body automatically returns to the workspace under the influence of the elastic forces.

The elastic member is a torsion spring mounted on the spindle. A first torsion arm of the torsion spring is connected with the body which always tends to move towards workspace. The second torsion arm is fixed relatively to the spindle.

The reset mechanism also comprises a self-locking assembly which contains the first wedge and the second wedge, where the first wedge is fixedly arranged on the spindle and where the second wedge is arranged on a reset apparatus. The first wedge and the second wedge prevent movement of the body that is confined to a loading area.

The reset apparatus is further provided with a drive part which one end is near the first wedge. When the drive part is pulled out, it causes the second wedge move away to be freed from the first wedge that limits position of the second wedge by preventing movement of the second wedge. Location of the body is automatically reset and it returns to the workspace due to action of the elastic member.

The reset mechanism also includes the first subshaft, the first elastic member and a tension spring. The first sub shaft is provided with the drive part, the first ratchet, the second ratchet, the third ratchet and the second wedge respectively. The two ends of the first sub shaft are rotationally connected with the body.

The drive part is fixedly connected with the first ratchet and is rotatable with respect to the first subshaft. The one end of the tension spring is connected with the body and the other end is connected accordingly with the drive part. The drive part can be reset.

The second ratchet is fixed to the first subshaft and the first ratchet drives the second ratchet to rotate directionally. The third ratchet is fixed to the second wedge and the third ratchet and the second wedge move axially together in relation to the first subshaft. The third ratchet is provided with the first detent and the second detent, where the first detent and the second detent are spaced from each other and adapted to the second ratchet. When the second ratchet engages the first detent of the third ratchet, the second wedge is driven away from the first wedge by the third ratchet.

Between the body and the second wedge, the first elastic member is provided, and when the second ratchet engages the second detent of the third ratchet, the second wedge is moved to the position limited by the first wedge.

The reset apparatus comprises the second subshaft connected with the body. The second subshaft is parallel to the first subshaft. The one end of the second wedge is installed on the second subshaft and corresponds to the first wedge. When the second wedge moves axially along the second subshaft to the corresponding position of the first wedge, the position of the second wedge is limited by the position to the first wedge.

The locking mechanism comprises a pin member and a toggle lever, where the toggle lever is inserted into the body and rotates relative to the body. The second wedge is provided with a groove adapted to the pin member. The pin member, controlled by the toggle lever, is inserted or separated from the groove, thereby tightening or loosening the second wedge respectively.

The locking mechanism comprises a rotor, a pressing block and an elastic member. The pin member is inserted into a connection block connected with the body. The elastic member is arranged between the connection block and the pin member, and is fitted on the pin member. The pressing block is hinged with the connection block where the one end of the pressing block is pressed on the pin member and the other end is connected to the rotor.

The rotor is rotatable by the toggle lever to rotate the pressing block, thereby pressing or loosening the pin member which is inserted or separated from the groove on the second wedge. The toggle lever is provided with a regulating part which is disposed outside the body and is rotatable by the actuation of the toggle lever.

A spacing ring is provided on the side of a torsion spring and is fixedly arranged on the spindle. The one end of the torsion spring is connected to the body, and the other end is connected to the spacing ring.

The spindle and the body are matched with the reset mechanism. Accordingly, the body can be automatically reset to the workspace when rotating to the loading area. The reset mechanism has advantages of being simple in procedure, convenient in operation, and high in work efficiency.

In addition, the reset mechanism, according to the present invention, has a more ergonomic design.

Figure 1:
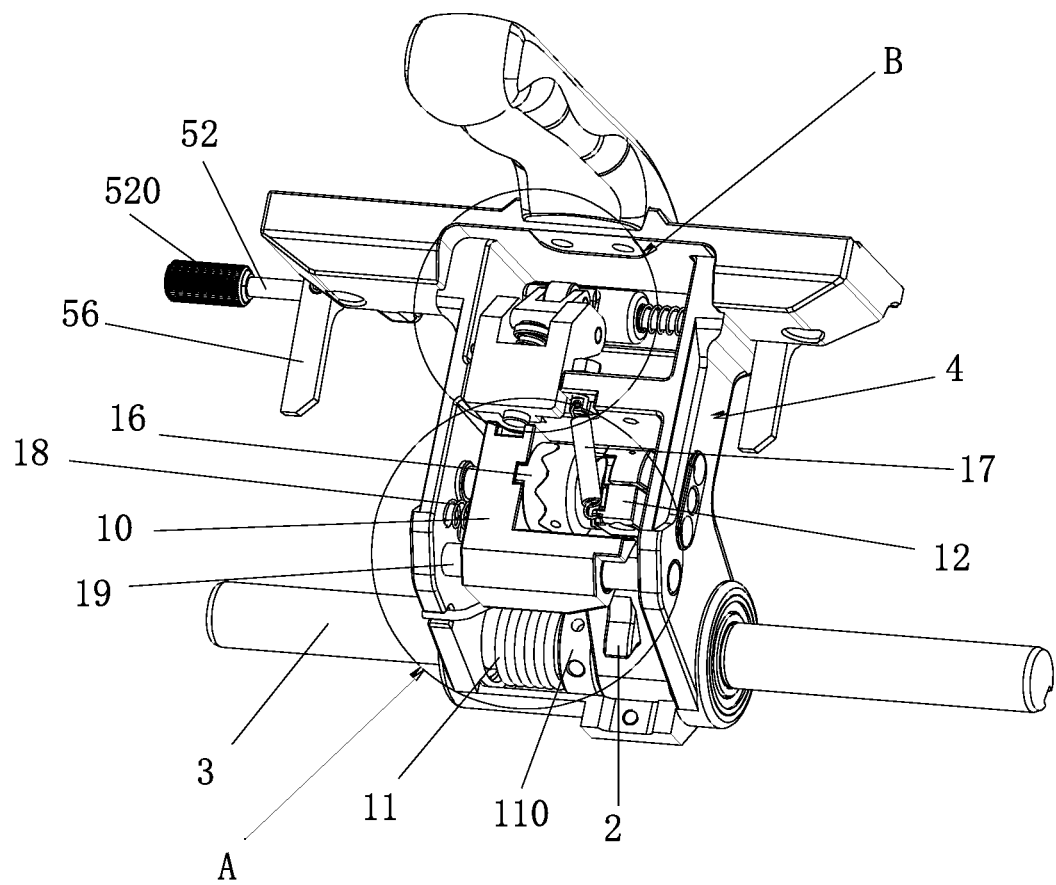
FIG. 1 is a schematic diagram of an embodiment of the reset mechanism of the key duplication device.

The objective, functional characteristics and merits of the reset mechanism of the key duplication device will be further explained based on embodiments with reference to the attached figures.

DETAILED DESCRIPTION OF THE INVENTION

The reset mechanism of the key duplication device will be described in details in conjunction with accompanying drawings and specific embodiments hereinafter. It should be understood that described herewith embodiments are only samples of the reset mechanism of the key duplication device claimed in the present application. Thus patent protection sought for the present invention should not be limited only to these samples since they do not constitute all embodiments of the invention. Based on the embodiments of the reset mechanism of the key duplication device described below, all other possible embodiments of the applicant's reset mechanism are within the scope of protection of the present invention.

Furthermore, in all described embodiments, indications of directions such as up, down, left, right, front, rear, and the like, used for explaining the position and movement of each part or element in the specific phase, are not absolute, but relative. When the specific phase changes, information about location of each part or element is to be respectively intellectually adapted.

In the key duplication device, a description of "first" and "second" is only used to describe the purpose, and cannot be understood as indicating the relative importance or implying quantity of indicated technical features. A feature that is defined as "first" or "second" may expressly or implicitly include at least one of the features.

In addition, technical solutions between various embodiments may be practiced or tested in conjunction with one another, but technical solutions must be evaluated in view of the skilled person in the field pertaining to the invention. When a combination of technical solutions is contradictory or cannot be achieved, it should be considered that the combination of such technical scheme does not exist and is not within the scope of protection sought by the present invention.

It should be understood that the embodiments described here are used to explain the key duplication devices, and in particular their reset mechanisms, and not to limit in any way a scope of protection of the present invention.

The loading area and workspace in the key duplication devices are known by the skilled person in the field, wherein the loading area is used to clamp workpieces and the workspace is used to machine the workpieces.

With reference to FIGS. 1-10, the reset mechanism comprises the reset apparatus 1, the spindle 3 and the body 4. The body 4 is provided with the worktable for key processing. The spindle 3 is inserted into the body 4 and is rotatably connected to the body 4. Accordingly the body 4 can be rotated from the workspace to the loading area or from the loading area to the workspace.

The reset apparatus 1 is installed on the body 4. When the body 4 is rotated from the workspace to the loading area, the body 4 automatically returns to the workspace upon action of the reset apparatus 1.

In particular, the reset apparatus 1 automatically resets the body 4 to the workspace, which can be realized by the torsion spring 11. The torsion spring 11 is mounted on the spindle 3. The first torsion arm of the torsion spring 11 is connected with the body 4 and is provided with a torsional moment, wherein the body 4 always tends to move towards workspace. The elastic forces of the torsion spring 11 always act on the body 4, thereby moving the body 4 toward the workspace. After the body 4 is rotated to the loading area against the elastic forces, when a withdrawal force exceeds the elastic forces, the body 4 automatically returns to the workspace. At work, the operator can complete the processing with a small directional force. The machining precision is higher and the consistency is better.

The spacing ring 110 is provided on the side of the torsion spring 11, accordingly the torsion spring 11 is fixedly arranged on the spindle 3. The spacing ring 110 passes through the spindle 3 and is locked by screws. The one end of the torsion spring 11 is connected to the body 4 and the other end is connected to the spacing ring 110, accordingly the position of the torsion spring 11 is fixed.

The above-referenced arrangement, in comparison with other known reset mechanisms of key duplication devices, features easier operation and higher efficiency, and provides a more ergonomic design.

In order to make the operation process more convenient, the self-locking assembly is arranged on the reset mechanism. The self-locking assembly includes the first wedge 2 and the second wedge 10 arranged on the reset apparatus 1, wherein the first wedge 2 is fixedly arranged on the spindle 3, that is to say, the body 4 can be displaced relative to the first wedge 2.

The first wedge 2 is disposed close to the second wedge 10 and has one end fitted to each other. When the body 4 is rotated to the loading area, the body 4 is confined in loading area by position of the first wedge 2 and the second wedge 10.

In the present embodiment, the worktable located in the workspace is in the initial state. The first wedge 2 and the second wedge 10 are in a non-confining position. The body 4 is free to rotate along the spindle 3. When the body 4 is rotated to the loading area against the elastic forces, when a withdrawal force exceeds the elastic forces, the body 4 moves in the opposite direction to the workspace. The second wedge 10 is moved against the first wedge 2 by the reset apparatus 1. Accordingly, the body 4 is confined in the loading area by the position of the first wedge 2 and the second wedge 10 that prevent movement of the body 4. Then, the body 4 receives the force that acts in the direction of the work area. At this time the second wedge 10 is moved away from the first wedge 2 by the reset apparatus 1.

Decrease of the withdrawal force, earlier exceeding the elastic forces, makes the body 4 automatically return to the workspace due to action of the elastic forces of the torsion spring 11—a process called restoration or reset of the position of the body.

The reset apparatus 1 is provided with the drive part 12. The one end of the drive part 12 is near the first wedge block 2. When the drive part 12 abuts the first wedge 2, the first wedge 2 forces the drive part 12 to rotate. The drive part 12 will cause the second wedge 10 to move away from the first wedge 2 to free location of the second wedge 10. The location of the body 4 is then automatically reset and the body returns to the workspace due to an action of the torsion spring 11.

Figure 2:
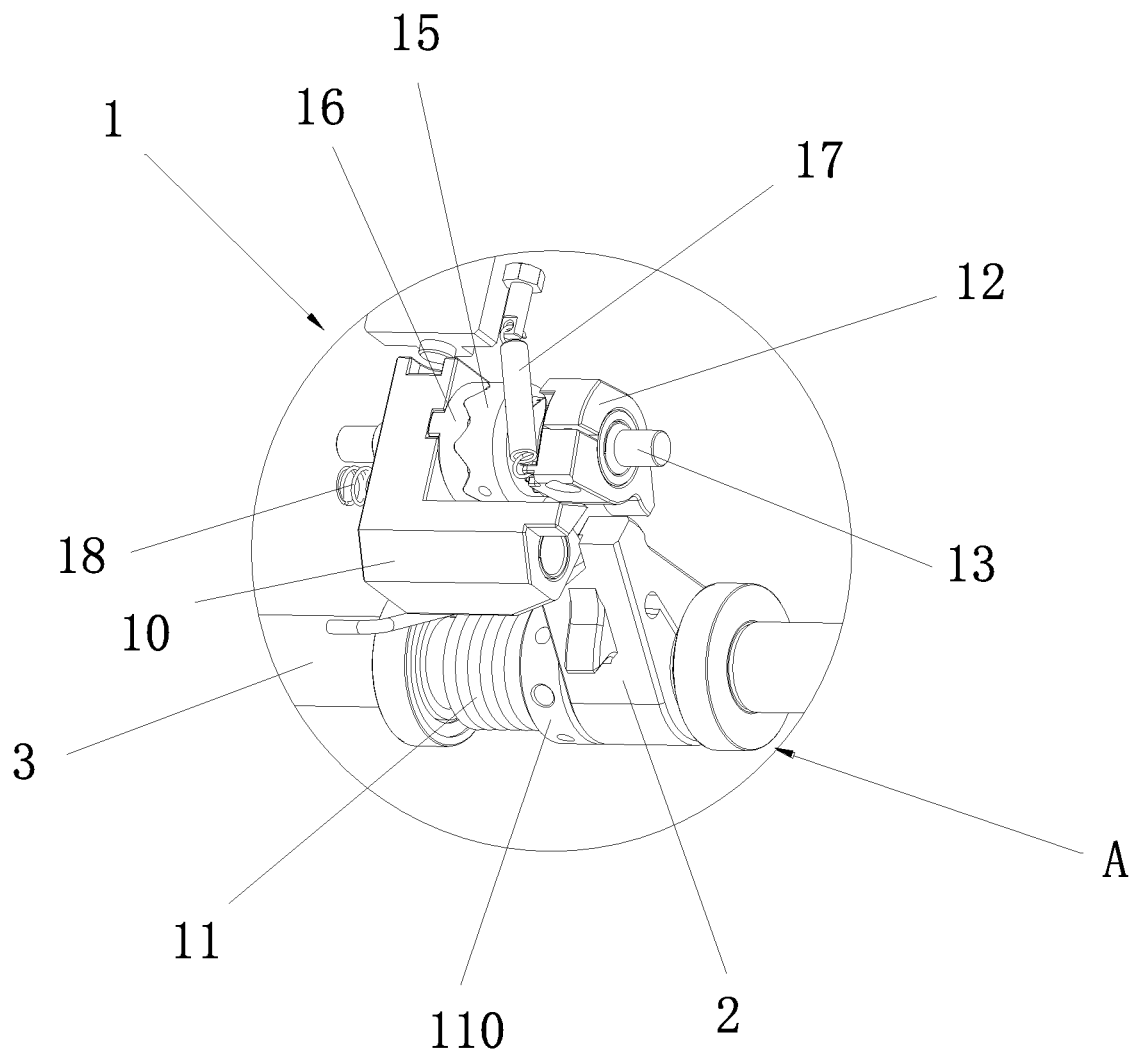
FIG. 2 is a partial enlarged view of position A in FIG. 1.

An example will be described more specifically with reference to FIG. 2. The reset mechanism 1 includes the first subshaft 13. The first subshaft 13 is respectively provided with the toggle lever 52, the first ratchet 14, the second ratchet 15, the third ratchet 16 and the second wedge 10. The two ends of the first subshaft 13 are rotationally connected with the body 4.

The drive part 12 is fixedly connected with the first ratchet 14 and is rotatable with respect to the first subshaft 13. The drive part 12 is connected with tension spring 17, and the one end of the tension spring 17 is connected with the body 4 and the other end is connected with the drive part 12. The tension spring 17 can reset the drive part 12 with a restoring force when the drive part 12 is rotated.

The second ratchet 15 is fixed to the first subshaft 13. The second ratchet 15 and the first subshaft 13 can rotate together. The one end of the second ratchet 15 is provided with the ratchets matched with the first ratchet 14. When the first ratchet 14 rotates, the second ratchet 15 can be driven to rotate directionally. The other end of the second ratchet 15 is provided with the ratchets matched with the third ratchet 16.

The third ratchet 16 and the second wedge 10 are fixed to the first subshaft 13, and can only move axially together in relation to the first subshaft 13. The one end of the third ratchet 16 is provided with a convex block 160. Correspondingly, the second wedge 10 is provided with a slot adapted to the convex block 160. The convex block 160 is inserted in the slot, accordingly the third ratchet 16 is fixedly connected with the second wedge 10. The manner in which the third ratchet 16 is fixedly connected to the second wedge 10 is not limited to this type, and welding or integral molding can be used.

Figure 5:
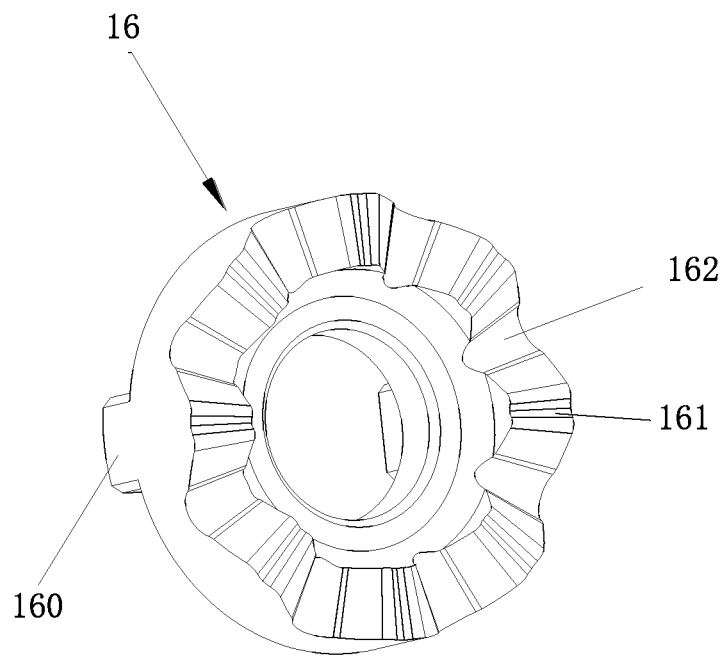
FIG. 5 is a schematic diagram of the embodiment of the third ratchet of the key duplication device.
Figure 6:
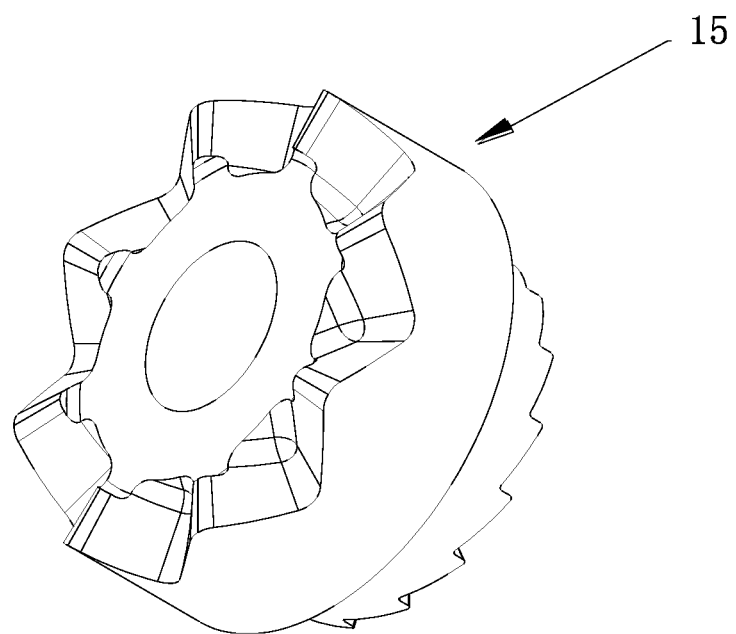
FIG. 6 is a schematic diagram of the embodiment of the second ratchet of the key duplication device.
Figure 7:
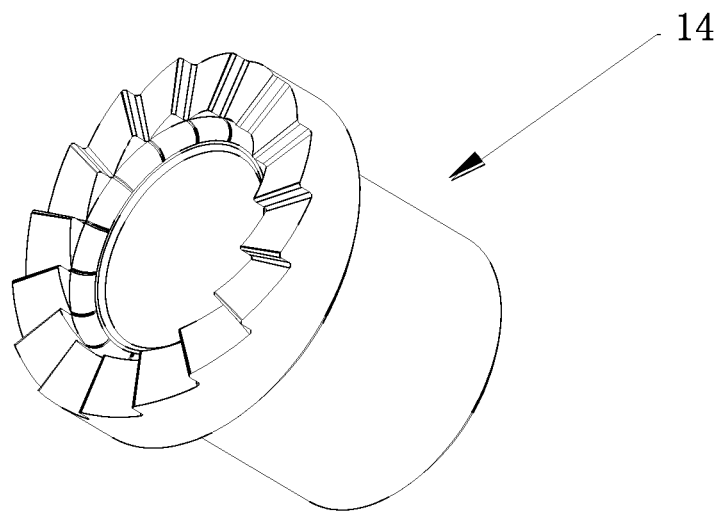
FIG. 7 is a schematic diagram of the embodiment of the first ratchet of the key duplication device.
Figure 8:
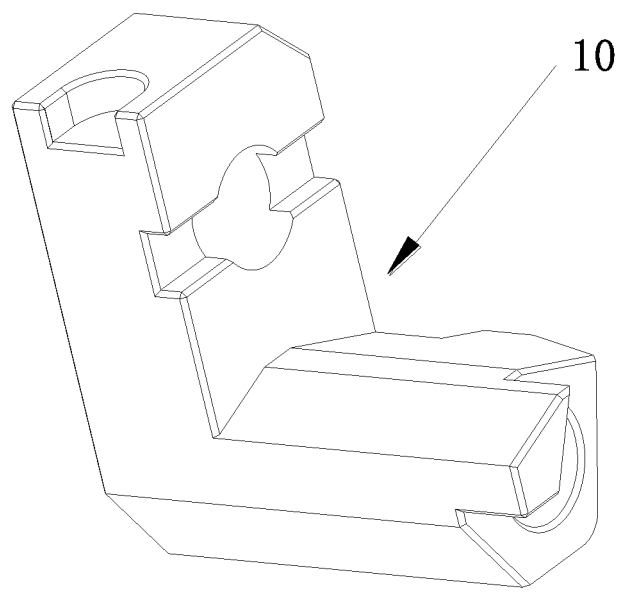
FIG. 8 is a schematic diagram of the embodiment of the second wedge of the key duplication device.
Figure 9:
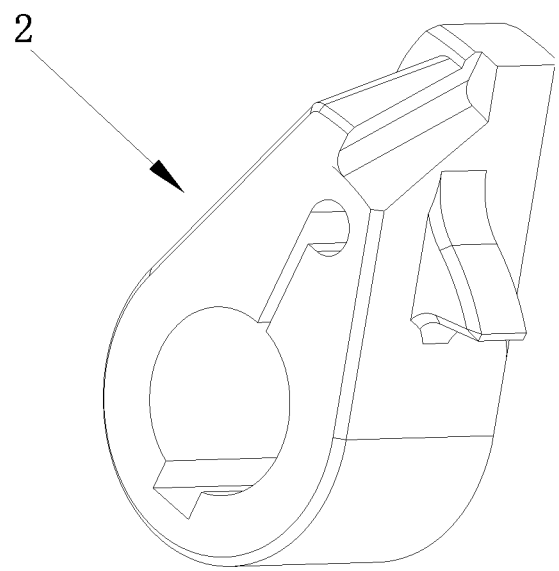
FIG. 9 is a schematic diagram of the embodiment of the first wedge block of the key duplication device.
Figure 10:
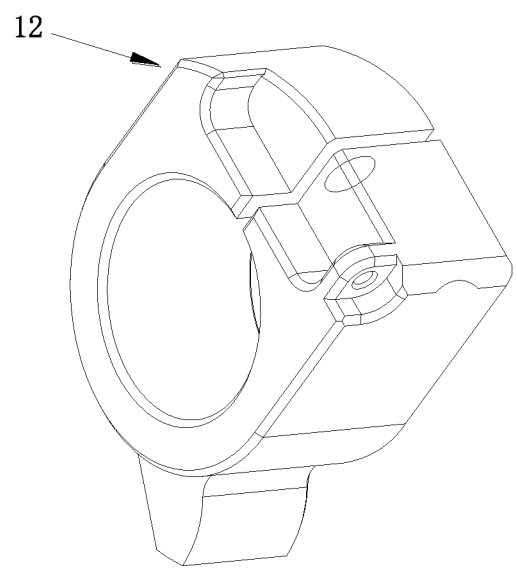
FIG. 10 is a schematic diagram of the embodiment of the drive part of the key duplication device.

Referring to FIG. 5, the one end of the third ratchet 16 is provided with the first detent 161 and the second detent 162, wherein the first detent 161 and the second detent 162 are spaced from each other, and are adapted to the second ratchet 15. Since the height of addendum of the first detent 161 is smaller than the second detent 162, the third ratchet 16 is moved away from the second ratchet wheel 15 when the second ratchet 15 engages the first detent 161. Then, the second wedge 10 is driven away from the position limited by the first wedge 2.

The first elastic member 18 is provided between the body 4 and the second wedge 10. The one end of the first elastic member 18 is abutted against the body 4, and the other end is against the second wedge 10. The second wedge 10, the third ratchet 16, the second ratchet 15, the first ratchet 14, and the drive part 12 are tightly attached. When the second ratchet 15 engages the second detent 162, the restoring forces of the first elastic member 18 move the second wedge 10 to the direction of the third ratchet 16.

Figure 4:
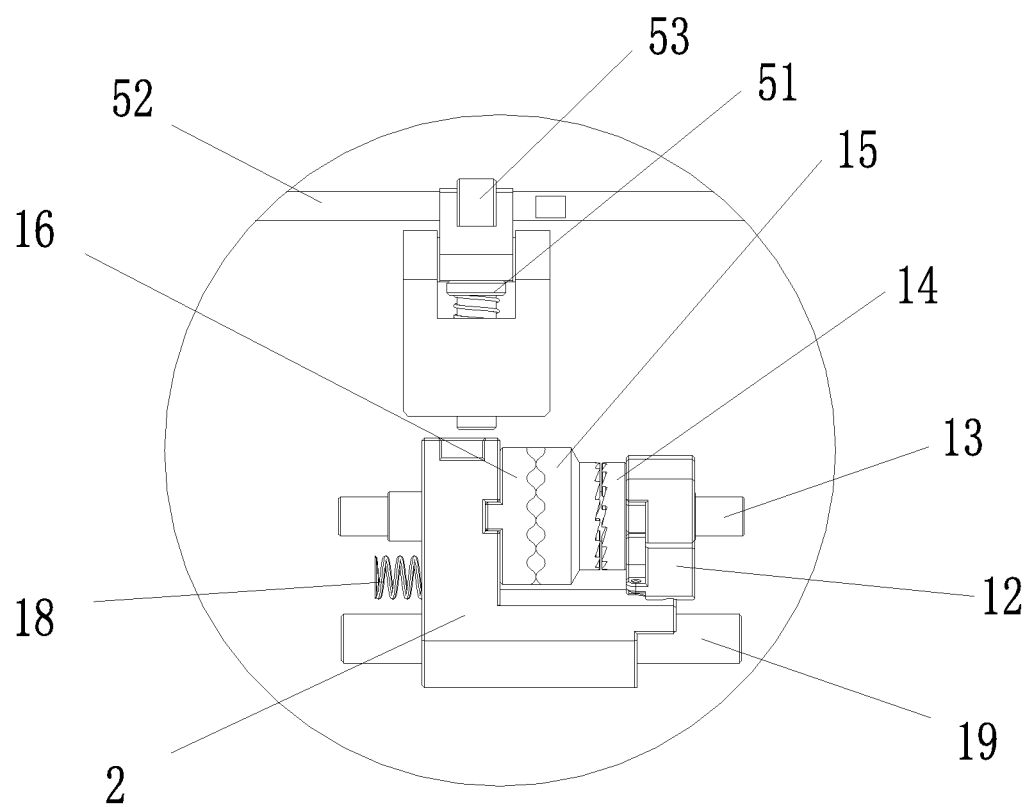
FIG. 4 is a partial enlarged view of the embodiment of the reset mechanism in non-self locking position.

The reset mechanism 1 is operated as follows: As shown in FIG. 4, in the initial state, the worktable is located in the workspace. The drive part 12 on the first subshaft 13 is away from the first wedge 2. The second ratchet 15 is meshed with the first detent 161 on the third ratchet 16. The second wedge 10 is away from the first wedge 2 which are disengaged from each other. At this time, the body 4 can be moved toward the loading area. When moved to the loading area, the body 4 is provided with a tangential force of the spindle 3. The tangential force is opposite to the workspace. Then, the drive part 12 resists against the first wedge 2, wherein the first wedge 2 pushes the drive part 12 to rotate. The drive part 12 rotates with the first ratchet 14 to drive the second ratchet 15 to rotate. The second ratchet 15 will engage the second detent 162 of the third ratchet 16. The third ratchet 16 is moved toward the second ratchet 15 by the restoring forces of the first elastic member 18, while the second wedge 10 is moved to the position limited by the first wedge 2. At this time, the body 4 is only confined in the loading area. The drive part 12 is restored to original position by the restoring forces of the tension spring 17. When the body 4 is provided with the tangential force of the spindle 3 again, the second wedge 10 resists against the first wedge 2. The body 4 rotates to the workspace due to action of the torsion spring 11 to realize the reset.

In the present embodiment, the reset apparatus is provided with the second subshaft 19. Accordingly, the second wedge 10 and the third ratchet 16 can only move axially along the first subshaft 13. The second subshaft 19 is parallel to the first subshaft 13 and the two ends of the second subshaft 19 are connected with the body 4. The one end of the second wedge 10 is installed on the second subshaft 19 and corresponds to the first wedge 2. The second wedge 10 can only move in the axial direction of the first subshaft 13 without rotation. When the second wedge 10 moves axially along the first subshaft 19 to the corresponding position of the first wedge 2, the first wedge 2 is limited to the second wedge 10.

In addition, in order to realize that the second wedge 10 and the third ratchet 16 can only move axially along the first subshaft 13, adapted guide pins and guideways is provided between the second wedge 10 and the first subshaft 13.

The reset mechanism is also provided with the locking mechanism 5, in order to avoid errors and improve safety performance. The effect of the locking device 5 is that the second wedge 10 cannot be moved away from the first wedge 2, even if the movable handle gives the body 4 a force in the opposite direction to the workspace. In other words, the body 4 cannot rotate relative to the spindle 3 at any rate.

In the present embodiment, the locking device 5 comprises at least the pin member 51 and the toggle lever 52, wherein the toggle lever 52 is inserted into the body 4 and rotates relative to the body 4. The one end of the toggle lever 52 is provided with a rotary knob 520. The pin member 51 is moved by the rotated toggle lever 52. The second wedge 10 is provided with the groove 101 adapted to the pin member 51. The pin member 51, controlled by the toggle lever 52, is inserted or separated from the groove 101, thereby tightening or loosening the second wedge 10.

The purpose of the locking device 5 is achieved by setting the rotor 53, the pressing block 54 and the second elastic member 55, the pin member 51 and the toggle lever 52.

Figure 3:
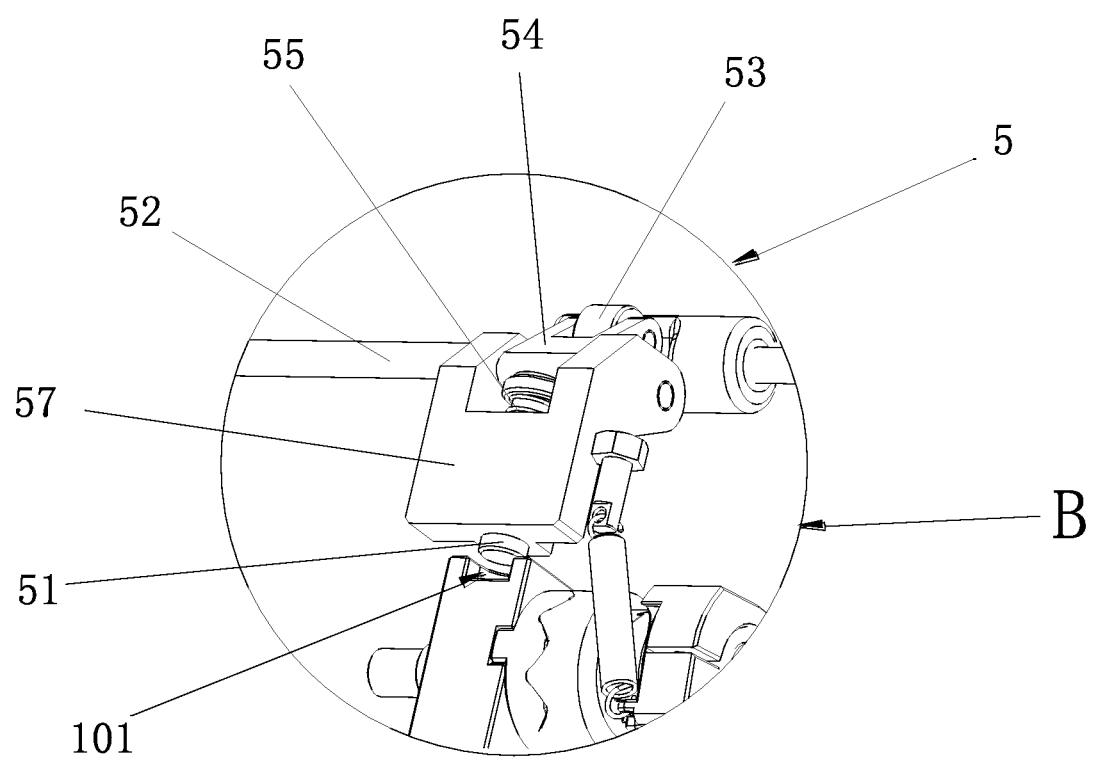
FIG. 3 is a partial enlarged view of position B in FIG. 1.

With reference to FIG. 3, the pin member 51 is inserted into the connection block 57 connected with the body 4. The pin member 51 is free to move downwardly and into the groove 101. The second elastic member 55 is arranged between the connection block 51 and the pin member 51, and is fitted on the pin member 51. Accordingly, the pin member 51 has an upward force when moved downward. The pressing block 54 is hinged with the connection block 57. The one end of the pressing block 54 is pressed on the pin member 51 and the other end is connected to the rotor 53. The rotor 53 is rotatable by the toggle lever 52 to rotate the pressing block 54 which is rotated along the connecting block 57, thereby moving the pin member 51 downward. When the toggle lever 52 is rotated in the reverse direction, the pressing block 54 is rotated in the reverse direction to cancel the pressure to the pin member 51. The pin member 51 is moved upwardly at the restoring force of the second elastic member 55.

For operator convenience, the toggle lever 52 is provided with the regulating part 56. The regulating part 56 is disposed outside the body 4. The lever 52 is rotated clockwise or counterclockwise by the upper and lower adjustment of the regulating part 56, thereby controlling the pin member 51 to be fitted or disengaged from the groove 101 of the second wedge 10.

The above description of the preferred embodiments of the key duplication device and its reset mechanism does not limit the scope of protection of the present invention. Any equivalent structures and equivalent process modifications, used according to the content of the specification and accompanying drawings of the instant patent application, no matter whether they are directly or indirectly used in any other related technical fields, should be included within the scope of protection of the present invention.

LIST OF REFERENCE NUMERALS

1—reset apparatus
2—first wedge
3—spindle
4—body
5—locking device
10—second wedge
11—torsion spring
12—drive part
13—first subshaft
14—first ratchet
15—second ratchet
16—third ratchet
17—tension spring
18—first elastic member
19—second subshaft
51—pin member
52—toggle lever
53—rotor
54—pressing block
55—second elastic member
57—connection block
101—groove
110—spacing ring
160—convex block
161—first detent
162—second detent
520—knob

The invention claimed is:

1. A reset mechanism for a key duplication device, wherein the reset mechanism comprises a reset apparatus, a spindle and a body, wherein
the spindle is inserted into the body and is rotatably connected to the body, wherein the body is repeatedly moveable along the spindle, between a workspace and a loading area, wherein
the reset apparatus comprises an elastic member connected with the body, wherein elastic forces of the elastic member always act on and move the body toward the workspace, wherein after the body is rotated to the loading area against the elastic forces of the elastic member, when a withdrawal force exceeds the elastic forces, the body automatically returns to the workspace under influence of the elastic forces, wherein
a self-locking assembly comprises a first wedge and a second wedge, wherein the first wedge is fixedly arranged on the spindle and the second wedge is arranged on the reset apparatus, wherein the first wedge and the second wedge prevent movement of the body that is confined in the loading area, wherein the reset apparatus is provided with a drive part whose one end is near the first wedge, when the drive part is pulled out, the drive part causes the second wedge to move away and to be freed from the first wedge, wherein a position of the body is automatically reset and the body returns to the workspace due to an action of the elastic member, wherein the reset mechanism comprises a first subshaft, a first elastic member and a tension spring, wherein the first subshaft is provided with the drive part, a first ratchet, a second ratchet, a third ratchet and the second wedge respectively, wherein the two ends of the first subshaft are rotationally connected with the body, wherein the drive part is fixedly connected with the first ratchet and is rotatable with respect to the first subshaft, wherein one end of the tension spring is connected with the body and another end is connected with the drive part accordingly, and the drive part can be reset, wherein the second ratchet is fixed to the first subshaft and the first ratchet drives the second ratchet to rotate directionally, wherein the third ratchet is fixed to the second wedge, and the third ratchet and the second wedge move axially together in relation to the first subshaft, wherein the third ratchet is provided with a first detent and a second detent, wherein the first detent and the second detent are spaced from each other, and are adapted to the second ratchet, wherein when the second ratchet engages the first detent of the third ratchet, the second wedge is driven away from the first wedge by the third ratchet, wherein the first elastic member is provided between the body and the second wedge, and wherein when the second ratchet engages the second detent of the third ratchet, the second wedge is moved to a position limited by the first wedge.

2. The reset mechanism according to claim 1, wherein the reset mechanism comprises a locking device, said locking device comprising a pin member and a toggle lever, wherein the toggle lever is inserted into the body and rotates relative to the body, wherein the second wedge is provided with a groove adapted to the pin member, and wherein the pin member controlled by the toggle lever is inserted or separated from the groove thereby tightening or loosening the second wedge.

3. The reset mechanism according to claim 1, wherein a spacing ring is provided on a side of a torsion spring and is fixedly arranged on the spindle, wherein one end of the torsion spring is connected to the body and another end is connected to the spacing ring.

4. A reset mechanism for a key duplication device, wherein the reset mechanism comprises a reset apparatus, a spindle and a body, wherein the spindle is inserted into the body and is rotatably connected to the body, wherein the body is repeatedly moveable along the spindle, between a workspace and a loading area, wherein the reset apparatus comprises an elastic member connected with the body, wherein elastic forces of the elastic member always act on and move the body toward the workspace, wherein after the body is rotated to the loading area against the elastic forces of the elastic member, when a withdrawal force exceeds the elastic forces, the body automatically returns to the workspace under influence of the elastic forces, wherein the reset mechanism comprises a first subshaft, a first elastic member and a tension spring, wherein the first subshaft is provided with a drive part, a first ratchet, a second ratchet, a third ratchet and a second wedge respectively, wherein the two ends of the first subshaft are rotationally connected with the body, wherein the drive part is fixedly connected with the first ratchet and is rotatable with respect to the first subshaft, wherein one end of the tension spring is connected with the body and another end is connected with the drive part accordingly, and the drive part can be reset, wherein the second ratchet is fixed to the first subshaft and the first ratchet drives the second ratchet to rotate directionally, wherein the third ratchet is fixed to the second wedge, and the third ratchet and the second wedge move axially together in relation to the first subshaft, wherein the third ratchet is provided with a first detent and a second detent, wherein the first detent and the second detent are spaced from each other, and are adapted to the second ratchet, wherein when the second ratchet engages the first detent of the third ratchet, the second wedge is driven away from the first wedge by the third ratchet, wherein the first elastic member is provided between the body and the second wedge, and wherein when the second ratchet engages the second detent of the third ratchet, the second wedge is moved to a position limited by the first wedge, wherein the reset mechanism comprises the reset apparatus comprising a second subshaft connected with the body, wherein the second subshaft is parallel to the first subshaft and one end of the second wedge is installed on the second subshaft, and corresponds to the first wedge, wherein when the second wedge moves axially along the second subshaft to the corresponding position of the first wedge, the position of the second wedge is limited by the position of the first wedge.

5. A reset mechanism for a key duplication device, wherein the reset mechanism comprises a reset apparatus, a spindle and a body, wherein the spindle is inserted into the body and is rotatably connected to the body, wherein the body is repeatedly moveable along the spindle, between a workspace and a loading area, wherein the reset apparatus comprises an elastic member connected with the body, wherein elastic forces of the elastic member always act on and move the body toward the workspace, wherein after the body is rotated to the loading area against the elastic forces of the elastic member, when a withdrawal force exceeds the elastic forces, the body automatically returns to the workspace under influence of the elastic forces, wherein the reset mechanism comprises a locking device, said locking device comprising a pin member and a toggle lever, wherein the toggle lever is inserted into the body and rotates relative to the body, wherein a second wedge is provided with a groove adapted to the pin member, and wherein the pin member controlled by the toggle lever is inserted or separated from the groove, thereby tightening or loosening the second wedge, wherein the locking device further comprises a rotor, a pressing block and a second elastic member, wherein the pin member is inserted into a connection block connected with the body, wherein the elastic member is arranged between a connection block and the pin member, and is fitted on the pin member, wherein the pressing block is hinged to the connection block, wherein one end of the pressing block is pressed on the pin member and another end is connected to the rotor, and wherein the rotor is rotatable by the toggle lever to rotate the pressing block, thereby pressing or loosening the pin member which is inserted or separated from the groove on the second wedge.

6. A reset mechanism for a key duplication device, wherein the reset mechanism comprises a reset apparatus, a spindle and a body, wherein the spindle is inserted into the body and is rotatably connected to the body, wherein the body is repeatedly moveable along the spindle, between a workspace and a loading area, wherein the reset apparatus comprises an elastic member connected with the body, wherein elastic forces of the elastic member always act on and move the body toward the workspace, wherein after the body is rotated to the loading area against the elastic forces of the elastic member, when a withdrawal force exceeds the elastic forces, the body automatically returns to the workspace under influence of the elastic forces, wherein the locking device comprises a rotor, a pressing block and a second elastic member, wherein a pin member is inserted into a connection block connected with the body, wherein the elastic member is arranged between the connection block and the pin member, and is fitted on the pin member, wherein the pressing block is hinged to the connection block, wherein one end of the pressing block is pressed on the pin member and another end is connected to the rotor, wherein the rotor is rotatable by a toggle lever to rotate the pressing block, thereby pressing or loosening the pin member which is inserted or separated from the groove on the second wedge, and wherein the toggle lever is provided with a regulating part, wherein the regulating part is disposed outside the body and is rotatable by actuation of the toggle lever.

* * * * *